(12) United States Patent
Kim

(10) Patent No.: US 11,299,154 B2
(45) Date of Patent: Apr. 12, 2022

(54) APPARATUS AND METHOD FOR PROVIDING USER INTERFACE FOR PLATOONING IN VEHICLE

(71) Applicants: Hyundai Motor Company, Seoul (KR); Kia Motors Corporation, Seoul (KR)

(72) Inventor: Sang Jun Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 458 days.

(21) Appl. No.: 16/558,688

(22) Filed: Sep. 3, 2019

(65) Prior Publication Data
US 2020/0324767 A1 Oct. 15, 2020

(30) Foreign Application Priority Data

Apr. 11, 2019 (KR) ........................ 10-2019-0042399

(51) Int. Cl.
*B60W 30/16* (2020.01)
*H04W 4/46* (2018.01)
(Continued)

(52) U.S. Cl.
CPC ............ *B60W 30/16* (2013.01); *B60W 50/10* (2013.01); *B60W 50/14* (2013.01);
(Continued)

(58) Field of Classification Search
CPC ...... B60W 30/16; B60W 50/10; B60W 50/14; B60W 2050/0075; B60W 2554/801; B60W 2556/45; B60W 50/00; B60W 50/085; B60W 2556/65; B60W 30/165; B60W 40/10; B60W 2050/143; B60W 2050/146; B60W 2554/00; G06F 3/04847; G06F 3/04883; G06F 3/167; G06F 2203/04808; G08G 1/22; G08G 1/20; H04W 4/46; H04W 4/023; B60K 37/06; B60K 2370/1438; B60K 2370/166; B60K 2370/171; B60K 2370/175; B60K 2370/1868; B60K 2370/1876;
(Continued)

(56) References Cited

U.S. PATENT DOCUMENTS 9,141,112 B1 * 9/2015 Loo .................. G08G 1/096866
10,252,721 B1 * 4/2019 Bai .......................... G08G 1/22
(Continued)

*Primary Examiner* — Richard M Camby
(74) *Attorney, Agent, or Firm* — Mintz Levin Cohn Ferris Glovsky and Popeo, P.C.; Peter F. Corless

(57) ABSTRACT

An apparatus for providing a user interface for platooning in a vehicle is provided. The apparatus includes a touch screen display, a communication circuit that communicates with the outside, and a control circuit electrically connected with the touch screen display and the communication circuit. The control circuit displays a first object corresponding to the vehicle and a second object corresponding to an outside vehicle included in a platooning group on the touch screen display and receives a touch input associated with the first object and the second object using the touch screen display. The vehicle is thus operated to adjust a distance between the vehicle and the outside vehicle in response to the touch input.

15 Claims, 7 Drawing Sheets

(51) Int. Cl.
*G06F 3/04883* (2022.01)
*G06F 3/04847* (2022.01)
*G06F 3/16* (2006.01)
*G08G 1/00* (2006.01)
*B60W 50/14* (2020.01)
*B60W 50/10* (2012.01)
*B60K 37/06* (2006.01)
*B60W 50/00* (2006.01)

(52) U.S. Cl.
CPC ...... *G06F 3/04847* (2013.01); *G06F 3/04883* (2013.01); *G06F 3/167* (2013.01); *G08G 1/22* (2013.01); *H04W 4/46* (2018.02); *B60K 37/06* (2013.01); *B60K 2370/1438* (2019.05); *B60W 2050/0075* (2013.01); *B60W 2554/801* (2020.02); *B60W 2556/45* (2020.02)

(58) Field of Classification Search
CPC ............ B60K 2370/5915; B60K 35/00; B60K 2370/11; B60K 2370/145; B60R 16/023; G05D 1/0295; G05D 1/0297; G05D 2201/0213; B60Y 2300/165
See application file for complete search history.

(56) References Cited

U.S. PATENT DOCUMENTS

| | | | |
|---|---|---|---|
| 2010/0256852 A1* | 10/2010 | Mudalige | G08G 1/22 701/24 |
| 2011/0307156 A1* | 12/2011 | Van Neste | B60Q 1/50 701/96 |
| 2014/0343832 A1* | 11/2014 | Goldberg | G08G 1/22 701/117 |
| 2017/0287233 A1* | 10/2017 | Nix | G07C 5/08 |
| 2017/0293296 A1* | 10/2017 | Stenneth | G06Q 20/10 |
| 2017/0369067 A1* | 12/2017 | Saigusa | B60W 30/18163 |
| 2018/0037227 A1* | 2/2018 | D'sa | B60W 50/045 |
| 2018/0190128 A1* | 7/2018 | Saigusa | B60W 40/04 |
| 2019/0171226 A1* | 6/2019 | Kim | G05D 1/0293 |
| 2020/0183546 A1* | 6/2020 | Kim | B60K 35/00 |

* cited by examiner

APPARATUS AND METHOD FOR PROVIDING USER INTERFACE FOR PLATOONING IN VEHICLE

CROSS-REFERENCE TO RELATED APPLICATION

This application is claims the benefit of priority to Korean Patent Application No. 10-2019-0042399, filed on Apr. 11, 2019, the entire contents of which are incorporated herein by reference.

TECHNICAL FIELD

The present disclosure relates to an apparatus and method for providing a user interface for platooning, and more particularly, to an apparatus and method for providing a user interface for inputting a command to adjust a distance between vehicles included in a platooning group.

BACKGROUND

Platooning is a technology in which a plurality of vehicles perform autonomous driving in the state where they are arranged at a specified interval in line (e.g., with a predetermined distance between the vehicles). While the plurality of vehicles perform the platooning, a leading vehicle which is a vehicle located in the frontline of a platooning line may control one or more following vehicles which follow the leading vehicle. The leading vehicle may maintain an interval between the plurality of vehicles in the platooning line and may exchange information regarding behaviors and situations of the plurality of vehicles included in the platooning line using vehicle-to-vehicle (V2V) communication. An interval between vehicles included in the platooning group may be adjusted while driving based on a driver intention.

In connection with a user interface of a platooning vehicle, the platooning vehicle may receive a command associated with platooning using a physical switch or button or the like. The platooning vehicle may fail to provide a user interface for receiving a command associated with platooning on its display. The command associated with the platooning is usually required while driving. However, an existing user interface is unable to provide convenience to a driver driving a vehicle in the platoon.

Particularly, an existing physical switch or button or the like is used to adjust a distance between vehicles in a platooning group, and the driver is required to locate a switch or button having a distance adjustment function to set a desired distance and the switch or button may require to be manipulated multiple times. Furthermore, in a conventional vehicle, it may be impossible for a leading vehicle to provide an input for distance adjustment. When a following vehicle randomly adjusts a distance between vehicles, a platooning line may be confused.

SUMMARY

The present disclosure provides an apparatus and method for providing a user interface for intuitively and simply inputting a command to adjust a distance between vehicles included in a platooning group. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for providing a user interface for platooning in a vehicle may include: a touch screen display, a communication circuit that communicates with the outside, and a control circuit electrically connected with the touch screen display and the communication circuit. The control circuit may be configured to display a first object that corresponds to the vehicle and a second object that corresponds to an outside vehicle included in a platooning group including the vehicle on the touch screen display, may receive a touch input associated with the first object and the second object using the touch screen display, and may be configured to adjust a behavior of the vehicle to adjust a distance between the vehicle and the outside vehicle in response to the touch input.

According to an exemplary embodiment, the control circuit may be configured to transmit a request to the outside vehicle to adjust the distance between the vehicle and the outside vehicle using the communication circuit. The control circuit may be configured to operate the vehicle to increase or decrease the distance between the vehicle and the outside vehicle based on a movement direction of a touch input to the first object and a movement direction of a touch input to the second object.

Additionally, the control circuit may be configured to operate the vehicle to decrease the distance between the vehicle and the outside vehicle, when a pinch-in input to the first object and the second object is detected. The control circuit may also be configured to operate the vehicle to increase the distance between the vehicle and the outside vehicle, when a pinch-out input to the first object and the second object is detected.

The vehicle may be further operated to decrease the distance between the vehicle and the outside vehicle after approval of the outside vehicle, when the vehicle is a leading vehicle. The vehicle may be operated to adjust the distance between the vehicle and the outside vehicle after approval of a leading vehicle, when the vehicle is a following vehicle.

According to an exemplary embodiment, the control circuit may be configured to display one or more objects, which indicate the distance between the vehicle and the outside vehicle, on the touch screen display, while the touch input is applied. Each of the one or more objects may be displayed in the form of a dot. Additionally, each of the one or more objects may be displayed in the form of a bar. The apparatus may further include a speaker and the control circuit may be configured to output voice guidance regarding adjustment of the distance using the speaker.

According to another aspect of the present disclosure, a method for providing a user interface for platooning in a vehicle may include: displaying a first object that corresponds to the vehicle and a second object that corresponds to an outside vehicle included in a platooning group including the vehicle, receiving a touch input associated with the first object and the second object, and adjusting a behavior of the vehicle (e.g., operating the vehicle) to adjust a distance between the vehicle and the outside vehicle in response to the touch input.

According to an exemplary embodiment, the method may further include transmitting a request to the outside vehicle to adjust the distance between the vehicle and the outside vehicle. The adjusting of the behavior of the vehicle may include operating the vehicle to increase or decrease the distance between the vehicle and the outside vehicle based on a movement direction of a touch input to the first object and a movement direction of a touch input to the second object.

Additionally, the method may include operating the vehicle to decrease the distance between the vehicle and the outside vehicle, when a pinch-in input to the first object and the second object is detected and operating the vehicle to increase the distance between the vehicle and the outside vehicle, when a pinch-out input to the first object and the second object is detected.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
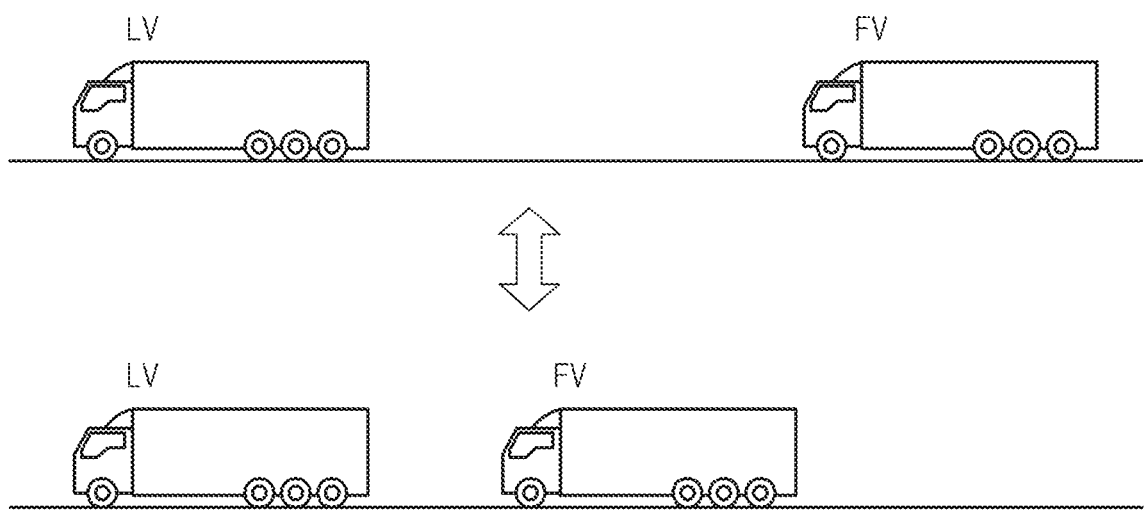
FIG. 1 is a drawing illustrating an environment where an apparatus for providing a user interface for platooning in a vehicle is operated, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating an environment where an apparatus for providing a user interface for platooning in a vehicle is operated, according to an exemplary embodiment of the present disclosure. Referring to FIG. 1, a leading vehicle LV and a following vehicle FV, which are included in a platooning group, may execute platooning on a road. The leading vehicle LV and the following vehicle FV may travel while maintaining a specified distance therebetween.

When traveling, the leading vehicle LV or the following vehicle FV may adjust a distance between the leading vehicle LV and the following vehicle FV. The leading vehicle LV or the following vehicle FV may increase or decrease an inter-vehicle distance based on a driver input. The leading vehicle LV and the following vehicle FV may provide an intuitive, simple user interface to the driver to receive an input for adjusting an inter-vehicle distance. A description will be given in detail of the user interface provided by the leading vehicle LV or the following vehicle FV with reference to FIGS. 2 to 6.

Figure 2:
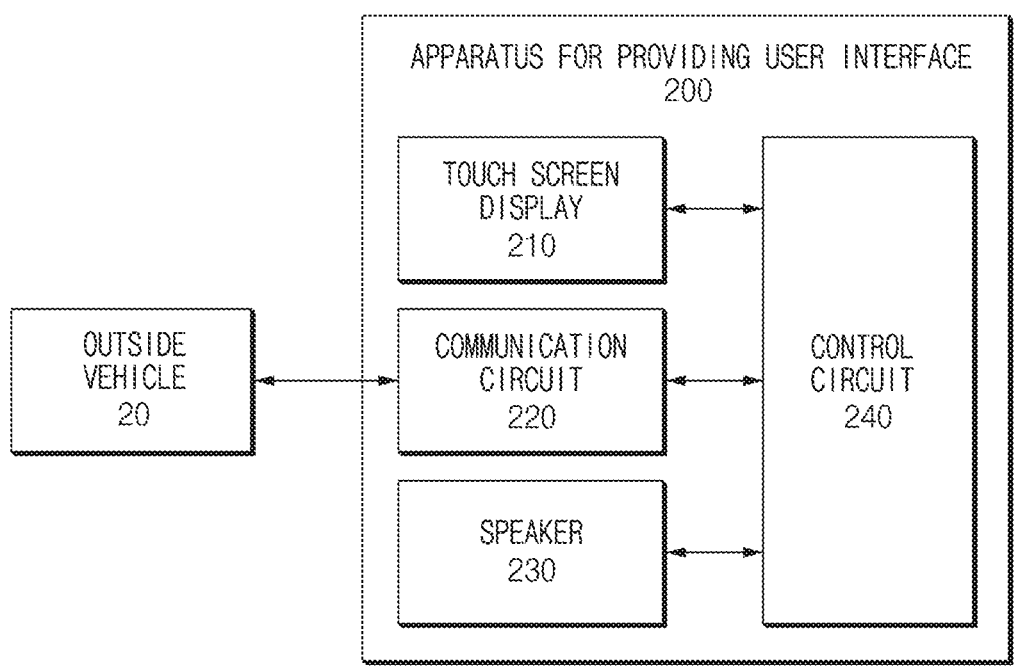
FIG. 2 is a block diagram illustrating a configuration of an apparatus for providing a user interface for platooning in a vehicle according to an exemplary embodiment of the present disclosure.

FIG. 2 is a block diagram illustrating a configuration of an apparatus 200 for providing a user interface for platooning in a vehicle according to an exemplary embodiment of the present disclosure. Referring to FIG. 2, the apparatus 200 for providing the user interface according to an exemplary embodiment may include a touch screen display 210, a communication circuit 220, a speaker 230, and a control circuit 240 (e.g., a controller having a processor and a memory). The apparatus 200 for providing the user interface may be mounted within a vehicle which supports platooning.

Particularly, the touch screen display 210 may include a touch panel and a display panel. The touch screen display 210 may be configured to output a graphic user interface and detect a touch input by a user. The touch screen display 210 may be installed on, for example, a dashboard of the vehicle. The communication circuit 220 may be configured to communicate with the outside (e.g., extraneous to the vehicle). The communication circuit 220 may be configured to wirelessly communicate with, for example, an outside vehicle 20. The speaker 230 may be configured to output a sound in the vehicle. The speaker 230 may be configured to output, for example, a notification or message associated with the vehicle to the driver.

The control circuit 240 may be electrically connected with the touch screen display 210, the communication circuit 220, and the speaker 230. The control circuit 240 may be configured to operate the touch screen display 210, the communication circuit 220, and the speaker 230 and may be configured to perform a variety of data processing and various arithmetic operations. The control circuit 240 may be, for example, an electronic control unit (ECU), a micro controller unit (MCU), or a sub-controller, which is mounted within the vehicle.

According to an exemplary embodiment, the control circuit 240 may be configured to display a first object that corresponds to the vehicle (e.g., subject vehicle) and a second object that corresponds to an outside vehicle 20 (e.g., platooning vehicle) included in a platooning group on the touch screen display 210. The control circuit 240 may be configured to obtain information regarding the vehicle and the outside vehicle 20. The control circuit 240 may also be configured to display an image or icon that corresponds to each of a driving road, the vehicle (e.g., subject vehicle), and the outside vehicle 20 (e.g., platoon vehicle) on the touch screen display 210. Additionally, the control circuit 240 may be configured to display the first object and the second object on points that correspond to locations of the vehicle and the outside vehicle 20 on the road.

According to an exemplary embodiment, the control circuit 240 may be configured to receive a touch input associated with the first object and the second object using the touch screen display 210. The control circuit 240 may be configured to detect a touch input of the user at each of the first object and the second object. For example, the control circuit 240 may be configured to receive a drag input at each of the first object and the second object. As another example, the control circuit 240 may be configured to receive a pinch-in input or a pinch-out input at the first object and the second object. The pinch-in input may be a touch input which closes or decreases a distance between two input points. The pinch-out input may be a touch input which increases a distance between the two input points.

Further, while a touch input is applied, the control circuit 240 may be configured to display one or more objects, which indicate a distance between the vehicle and the outside vehicle 20, on the touch screen display 210. Each of the one or more objects may be displayed in the form of a dot or bar. The control circuit 240 may be configured to change the number of objects, colors of the objects, lengths of the objects, and the like based on a distance between the vehicle and the outside vehicle 20.

According to an exemplary embodiment, the control circuit 240 may be configured to adjust a behavior of the vehicle (e.g., operate the vehicle) to adjust a distance between the vehicle and the outside vehicle 20 in response to the touch input. In particular, the control circuit 240 may be configured to operate the vehicle to increase or decrease a distance between the vehicle and the outside vehicle 20 based on a movement direction of a touch input to the first object and a movement direction of a touch input to the second object. For example, when a pinch-in input to the first object and the second object is detected, the control circuit 240 may be configured to operate the vehicle to decrease a distance between the vehicle and the outside vehicle 20. As another example, when a pinch-out input to the first object and the second object is detected, the control circuit 240 may be configured to operate the vehicle to increase a distance between the vehicle and the outside vehicle 20.

Additionally, the control circuit 240 may be configured to transmit a request to the outside vehicle 20 using the communication circuit 220 to adjust a distance between the vehicle and the outside vehicle 20. The control circuit 240 may be configured to transmit a request to the outside vehicle 20 to increase or decrease a distance between the vehicle and the outside vehicle 20. The outside vehicle 20 may then, in response, be configured to increase or decrease the distance between the vehicle and the outside vehicle 20 in response to the request. In other words, a controller on the outside vehicle 20 may be configured to receive the adjustment request and response thereto.

According to an exemplary embodiment, when the vehicle is a leading vehicle, after the request is approved by the outside vehicle 20, the control circuit 240 may be configured to adjust the vehicle to decrease a distance between the vehicle and the outside vehicle 20. When the leading vehicle increases a distance from a following vehicle, since there is a high probability that it will be performed to ensure safety and there is a minor effect on safety of a driver of the following vehicle, the control circuit 240 may be configured to operate the vehicle without approval of the following vehicle and execute the distance increase. However, when the leading vehicle decreases a distance from the following vehicle, effects such as an increase in fuel economy and an improvement in traffic flow may be obtained. Accordingly, the control circuit 240 may be configured to hold the execution of the distance adjustment until the request is approved by the following vehicle.

When the vehicle is a following vehicle, after the request is approved by a leading vehicle, the control circuit 240 may be configured to operate the vehicle to adjust a distance between the vehicle and the outside vehicle 20. When the following vehicle adjusts a distance from the leading vehicle, after the request is approved by the leading vehicle which manages a platooning group, the control circuit 240 may be configured to adjust the vehicle operation. Additionally, the control circuit 240 may be configured to output voice guidance regarding an adjustment of a distance using the speaker 230. In particular, the control circuit 240 may be configured to output a voice that provides a notification regarding distance adjustment to minimize gaze dispersion of the driver.

Figure 3:
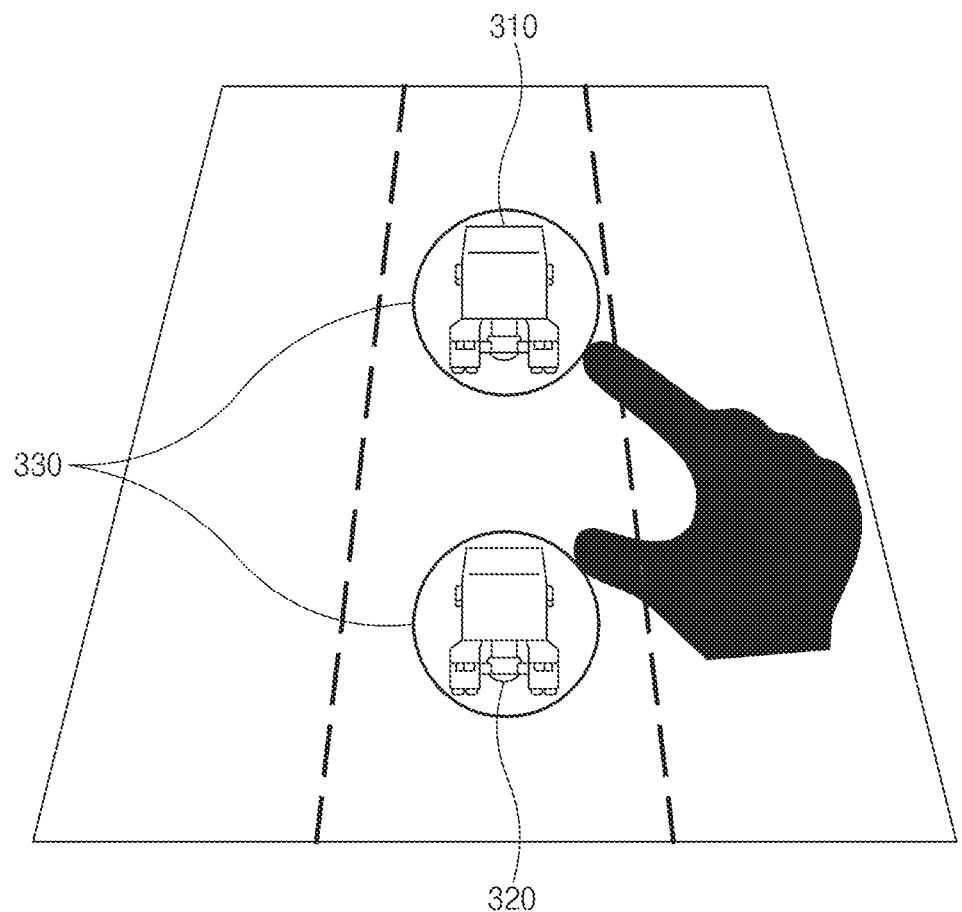
FIG. 3 is a drawing illustrating an exemplary operation of an apparatus for providing a user interface for platooning in a vehicle according to an exemplary embodiment of the present disclosure.

FIG. 3 is a drawing illustrating an exemplary operation of an apparatus for providing a user interface for platooning in a vehicle according to an exemplary embodiment of the present disclosure. Referring to FIG. 3, the vehicle according to an exemplary embodiment may output a graphic user interface using a touch screen display mounted therein. The vehicle may be configured to display a first object 310 that corresponds to the vehicle (e.g., subject vehicle) and a second object 320 that corresponds to an outside vehicle (e.g., platoon vehicle) included in a platooning group. A user may apply a pinch-in input or a pinch-out input for adjusting an inter-vehicle distance of the platooning group. When a touch input of the user is applied at each of the first object 310 and the second object 320 on the display, a circular indication 330 indicating that the touch input is applied may be displayed around each of the first object 310 and the second object 320.

Figure 4:
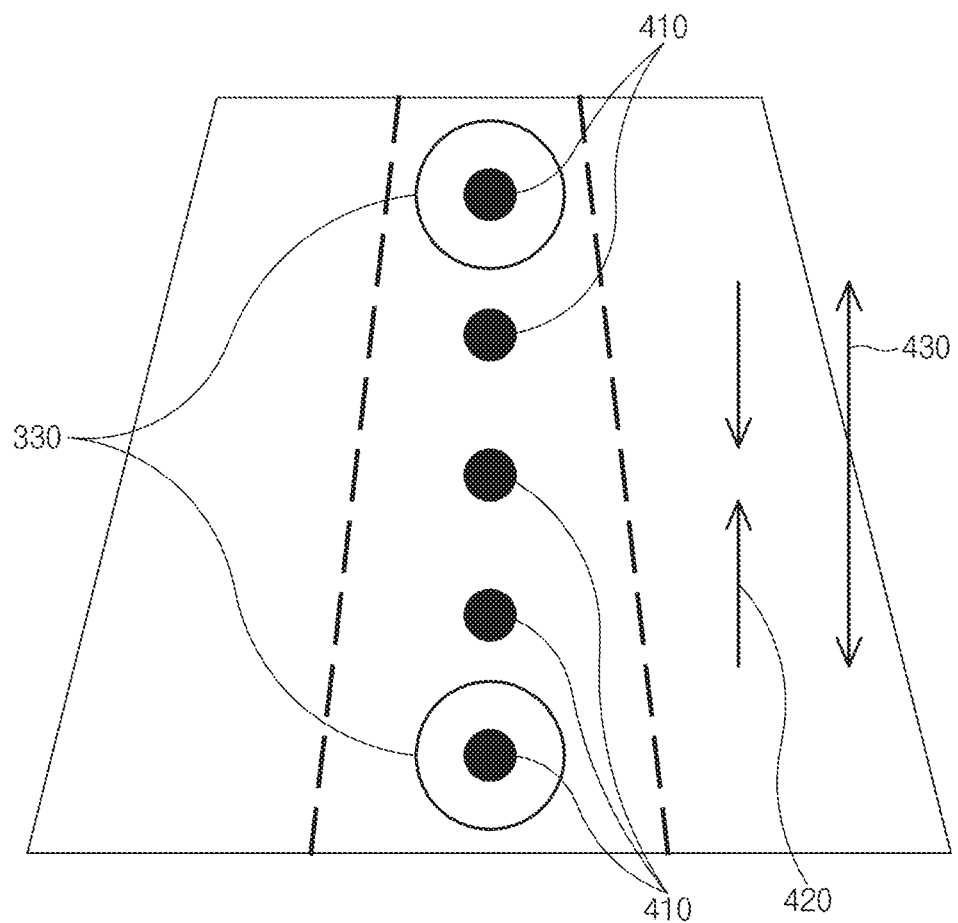
FIG. 4 is a drawing illustrating an exemplary operation of an apparatus for providing a user interface for platooning in a vehicle according to an exemplary embodiment of the present disclosure.

FIG. 4 is a drawing illustrating an exemplary operation of an apparatus for providing a user interface for platooning in a vehicle according to an exemplary embodiment of the present disclosure. Referring to FIG. 4, the vehicle according to an exemplary embodiment may output a graphic user interface using a touch screen display mounted therein. After a touch input of a driver is applied at each of a first object 310 and a second object 320 of FIG. 3, the vehicle may be configured to display circular indications 330 and display a plurality of objects 410, each of which has a dot shape, between the circular indications 330.

The plurality of objects 410 may be indications of a setting distance between the vehicle and an outside vehicle. For example, when a pinch-in input 420 is applied, the vehicle may be configured to reduce the number of the plurality of objects 410. For another example, when a pinch-out input 430 is applied, the vehicle may be configured to increase the number of the plurality of objects 410. In FIG. 4, an exemplary embodiment is exemplified as the objects 410 are displayed as a plurality of dots. However, exemplary embodiments are not limited thereto. For example, the objects 410 may be displayed in another form or in the form of one bar.

Figure 5:
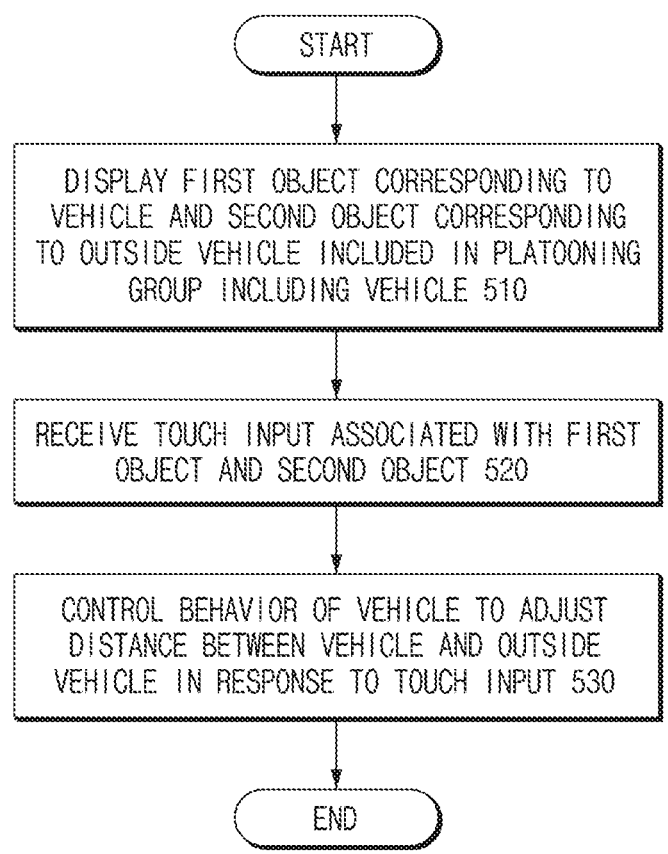
FIG. 5 is a flowchart illustrating a method for providing a user interface for platooning in a vehicle according to an exemplary embodiment of the present disclosure.

FIG. 5 is a flowchart illustrating a method for providing a user interface for platooning in a vehicle. Hereinafter, it is assumed that a vehicle including an apparatus 200 for providing a user interface in FIG. 2 performs a process of FIG. 5. Furthermore, in a description of FIG. 5, an operation described as being performed by the vehicle may be understood as being executed by a control circuit 240 (e.g., controller) of the apparatus 200 for providing the user interface.

Referring to FIG. 5, in operation 510, the vehicle may be configured to display a first object that corresponds to the vehicle and a second object that corresponds to an outside vehicle included in a platooning group including the vehicle. For example, the vehicle may be configured to display an icon of the vehicle and an icon of the outside vehicle on a touch screen display mounted therein.

In operation 520, the vehicle may be configured to receive a touch associated with the first object and the second object. For example, the vehicle may be configured to receive a multi-touch input at the first object and the second object on the display. The multi-touch input may be one of various inputs such as a drag input, a pinch-in input, or a pinch-out input. In operation 530, the vehicle may operate to adjust a distance between the vehicle and the outside vehicle in response to the touch input. For example, the vehicle may be configured to reset an inter-vehicle distance based on a direction of the touch input and increase or decrease a distance between the vehicle and the outside vehicle to maintain the reset distance.

Figure 6:
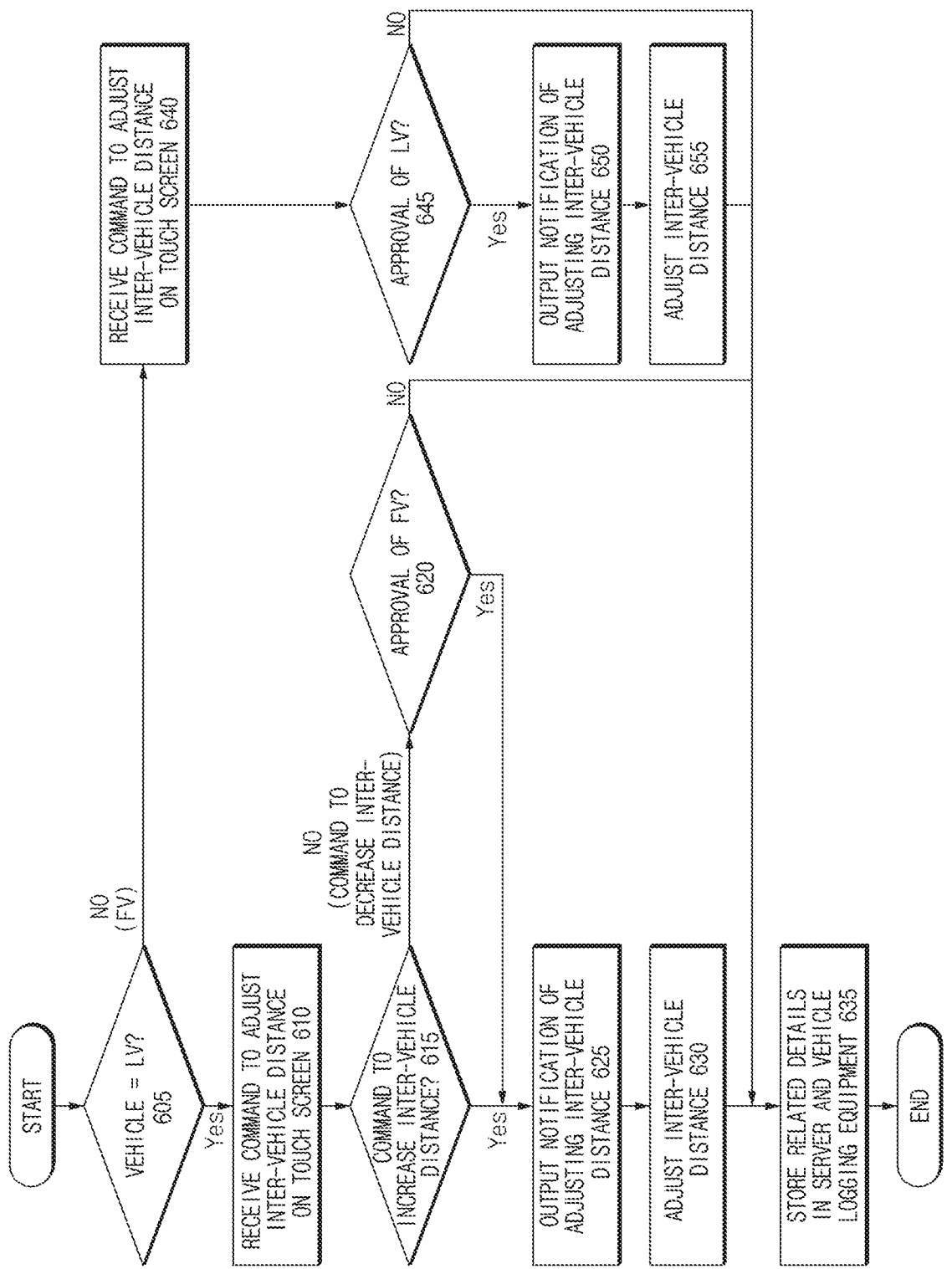
FIG. 6 is a flowchart illustrating a method for providing a user interface for platooning in a vehicle according to an exemplary embodiment of the present disclosure.

FIG. 6 is a flowchart illustrating a method for providing a user interface for platooning in a vehicle. Hereinafter, it is assumed that a vehicle including an apparatus 200 for providing a user interface in FIG. 2 performs a process of FIG. 6. Furthermore, in a description of FIG. 6, an operation described as being performed by the vehicle may be understood as being executed by a control circuit 240 (e.g., controller) of the apparatus 200 for providing the user interface.

Referring to FIG. 6, in operation 605, the vehicle may be configured to determine whether the vehicle is a leading vehicle included in a platooning group. When the vehicle is the leading vehicle, in operation 610, the vehicle may be configured to receive a command to adjust an inter-vehicle distance on a touch screen mounted therein. In operation 615, the vehicle may be configured to determine whether the command is a command to increase an inter-vehicle distance. When the command is a command to decrease an inter-vehicle distance, in operation 620, the vehicle may be configured to determine whether the command to decrease the inter-vehicle distance is approved by a following vehicle.

When the command is a command to increase the inter-vehicle distance or when the command to decrease the inter-vehicle distance is approved by the following vehicle, in operation 625, the vehicle may be configured to output a notification regarding an adjustment of the inter-vehicle distance. When the command to decrease the inter-vehicle distance is not approved by the following vehicle, the inter-vehicle distance may be maintained (e.g. not adjusted). In operation 630, the vehicle may be configured to adjust the inter-vehicle distance. In operation 635, the vehicle may be configured to store details/information associated with adjusting, approving, and denying the inter-vehicle distance in a server and vehicle logging equipment. Such information may be accessed at a later point in time.

When the vehicle is the following vehicle, in operation 640, the vehicle may be configured to receive a command to adjust an inter-vehicle distance on the touch screen. In operation 645, the vehicle may be configured to determine whether the command is approved by a leading vehicle. When the command is approved, in operation 650, the vehicle may be configured to output a notification of adjusting the inter-vehicle distance. When the command is not approved, the inter-vehicle distance is maintained. In operation 655, the vehicle may be configured to adjust the inter-vehicle distance. After operation 655 is performed, the vehicle may perform operation 635.

Figure 7:
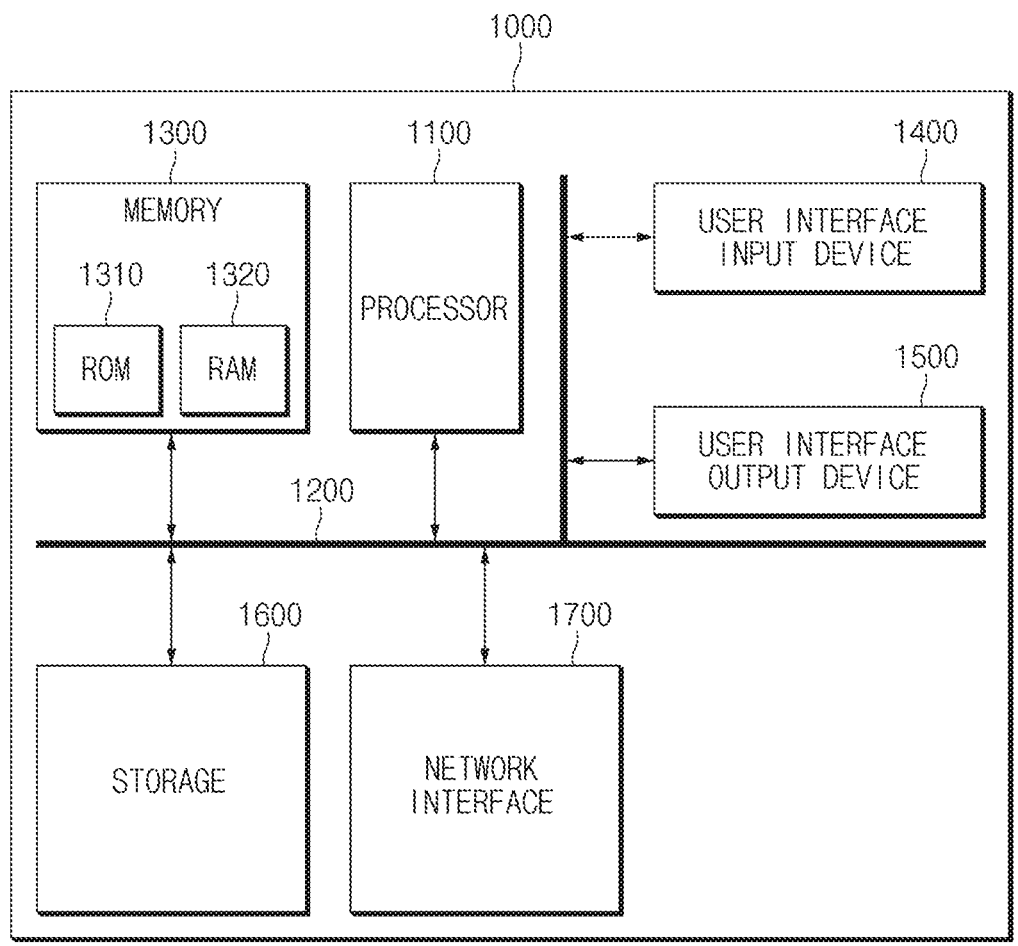
FIG. 7 is a block diagram illustrating a configuration of a computing system according to an exemplary embodiment of the present disclosure.

FIG. 7 is a block diagram illustrating a configuration of a computing system according to an exemplary embodiment of the present disclosure. Referring to FIG. 7, the above-mentioned method according to an exemplary embodiment of the present disclosure may be implemented by a computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device configured to process instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (e.g., the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Exemplary embodiments of the present disclosure may perform adjustment of a distance between vehicles based on a touch input associated with objects that correspond to the vehicles included in a platooning group to provide an intuitive, simple user interface to a driver of a platooning vehicle. In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. An apparatus for providing a user interface for platooning in a vehicle, comprising:
    a touch screen display mounted within the vehicle;
    a communication circuit configured to communicate with an outside vehicle; and
    a control circuit electrically connected with the touch screen display and the communication circuit,
    wherein the control circuit is configured to:
        display a first object that corresponds to the vehicle and a second object that corresponds to the outside vehicle included in a platooning group on the touch screen display;
        receive a touch input associated with the first object and the second object using the touch screen display; and
        operate the vehicle to adjust a distance between the vehicle and the outside vehicle in response to the touch input.

2. The apparatus of claim 1, wherein the control circuit is configured to transmit a request to the outside vehicle to adjust the distance between the vehicle and the outside vehicle using the communication circuit.

3. The apparatus of claim 1, wherein the control circuit is configured to operate the vehicle to increase or decrease the distance between the vehicle and the outside vehicle based on a movement direction of a touch input at the first object and a movement direction of a touch input at the second object.

4. The apparatus of claim 1, wherein the control circuit is configured to operate the vehicle to decrease the distance between the vehicle and the outside vehicle, when a pinch-in input at the first object and the second object is detected.

5. The apparatus of claim 1, wherein the control circuit is configured to operate the vehicle to increase the distance between the vehicle and the outside vehicle, when a pinch-out input at the first object and the second object is detected.

6. The apparatus of claim 1, wherein the control circuit is configured to operate the vehicle to decrease the distance between the vehicle and the outside vehicle after approval of the outside vehicle, when the vehicle is a leading vehicle.

7. The apparatus of claim 1, wherein the control circuit is configured to operate the vehicle to adjust the distance between the vehicle and the outside vehicle after approval of a leading vehicle, when the vehicle is a following vehicle.

8. The apparatus of claim 1, wherein the control circuit is configured to display one or more objects, which indicate the distance between the vehicle and the outside vehicle, on the touch screen display, while the touch input is applied.

9. The apparatus of claim 8, wherein each of the one or more objects is displayed in the form of a dot.

10. The apparatus of claim 8, wherein each of the one or more objects is displayed in the form of a bar.

11. The apparatus of claim 1, further comprising:
    a speaker, wherein the control circuit is configured to output voice guidance regarding adjustment of the distance using the speaker.

12. A method for providing a user interface for platooning in a vehicle, comprising:
    displaying, by a controller, a first object that corresponds to the vehicle and a second object that corresponds to an outside vehicle included in a platooning group;
    receiving, by the controller, a touch input associated with the first object and the second object; and
    operating, by the controller, the vehicle to adjust a distance between the vehicle and the outside vehicle in response to the touch input.

13. The method of claim 12, further comprising:
    transmitting, by the controller, a request to the outside vehicle to adjust the distance between the vehicle and the outside vehicle.

14. The method of claim 12, further comprising:
    operating, by the controller, the vehicle to increase or decrease the distance between the vehicle and the outside vehicle based on a movement direction of a touch input at the first object and a movement direction of a touch input at the second object.

15. The method of claim 12, further comprising:
    operating, by the controller, the vehicle to decrease the distance between the vehicle and the outside vehicle, when a pinch-in input at the first object and the second object is detected; and operating, by the controller, the vehicle to increase the distance between the vehicle and the outside vehicle, when a pinch-out input at the first object and the second object is detected.

\* \* \* \* \*